Jan. 14, 1964    H. SCHUTZBERGER ET AL    3,117,382
ELECTRICAL CIRCUIT FOR TEACHING MACHINES
Filed Sept. 29, 1961    3 Sheets-Sheet 1

INVENTOR.
GUSTAVUS JAMES SIMMONS
HENRY SCHUTZBERGER
BY
George A. Woodruff

Jan. 14, 1964   H. SCHUTZBERGER ETAL   3,117,382
ELECTRICAL CIRCUIT FOR TEACHING MACHINES
Filed Sept. 29, 1961   3 Sheets-Sheet 2

INVENTOR.
GUSTAVUS JAMES SIMMONS
HENRY SCHUTZBERGER
BY
George A. Woodruff

Jan. 14, 1964   H. SCHUTZBERGER ETAL   3,117,382
ELECTRICAL CIRCUIT FOR TEACHING MACHINES
Filed Sept. 29, 1961   3 Sheets-Sheet 3

INVENTOR.
GUSTAVUS JAMES SIMMONS
HENRY SCHUTZBERGER
BY
George A. Woodruff

United States Patent Office 3,117,382
Patented Jan. 14, 1964

3,117,382
ELECTRICAL CIRCUIT FOR TEACHING MACHINES
Henry Schutzberger and Gustavus J. Simmons, both of Albuquerque, N. Mex., assignors, by mesne assignments, to Teaching Machines, Incorporated, Albuquerque, N. Mex., a corporation of Delaware
Filed Sept. 29, 1961, Ser. No. 141,815
9 Claims. (Cl. 35—9)

This invention relates to teaching machines and is particularly directed to novel apparatus for performing the logic operations required for teaching machines.

In the teaching machine art, a film strip is provided with each frame thereof containing a question and a plurality of answers. The student views the film on an individual viewing device and "answers" the question by pressing the appropriate one of several buttons which each actuates mechanism within the viewing device. If the correct button is pressed, the film advances to the next question. If an incorrect button is pressed, some punitive action is taken, such as flashing a light, sounding an audible signal, or signaling a score keeping device.

Numerous devices have been proposed heretofore for accomplishing this. However, the devices of the prior art have employed extremely complicated electronic circuitry and, hence, have been very delicate to handle and have required considerable maintenance. Moreover, the devices of the prior art have been extremely expensive and, therefore, have not found wide acceptance.

These disadvantages of prior art teaching machines are overcome with the present invention and a novel teaching machine mechanism is disclosed which employs non-electronic circuitry and is extremely simple in construction and which requires virtually no maintenance. Furthermore, the device of the present invention is very inexpensive to produce and is well suited for assembly line production, thereby permitting further cost reduction. At the same time, the device of the present invention is rugged and durable.

The advantages of the present invention are preferably attained by providing novel apparatus for use with a teaching machine employing an information bearing film strip, said apparatus comprising an electrical network including a plurality of parallel open circuits, means responsive to information on said film strip for conditioning said network to establish one of said parallel open circuits as a preferred circuit, a plurality of circuit completing members, one of said members being operable to close said preferred circuit, the other of said members being operable to close other of said parallel circuits.

Accordingly, it is an object of the present invention to provide novel apparatus for performing the logic operations required for teaching machines.

Another object of the present invention is to provide novel apparatus for performing the logic operations required for teaching machines which apparatus is rugged and requires virtually no maintenance.

A further object of the present invention is to provide novel apparatus for performing the logic operations required for teaching machines which apparatus is simple in circuitry and construction and is economical to produce.

An additional object of the present invention is to provide a novel non-electronic logic circuit.

Another object of the present invention is to provide novel apparatus for performing the logic operations required for teaching machines which apparatus is "cheat-proof."

A specific object of the present invention is to provide novel apparatus for use with a teaching machine employing an information bearing film strip, said apparatus comprising an electrical network including a plurality of parallel open circuits, means responsive to information on said film strip for conditioning said network to establish one of said parallel open circuits as a preferred circuit, a plurality of circuit completing members, each of said circuit completing members being operable to complete a respective one of said parallel circuits, means for indicating completion of said preferred circuit, means for indicating completion of any of said parallel circuits other than said preferred circuit, and means for precluding completion of said preferred circuit except by individual actuation of the appropriate one of said circuit completing members.

These and other objects and features of the present invention will be apparent from the following detailed description wherein reference is made to the figures of the accompanying drawing:

Figure 1:
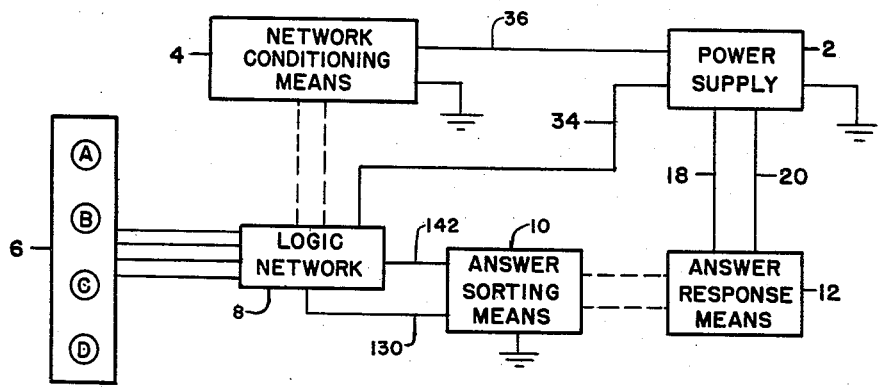
FIG. 1 is a block diagram of a teaching machine embodying the present invention.

In that form of the invention chosen for purposes of illustration in FIG. 1, a teaching machine is shown comprising a power supply 2, a network conditioning means 4, answering means 6, a logic network 8, answer sorting means 10, and answer response means 12.

In use, the student is provided with a question and a plurality of answers, of which only one is correct. The answering means 6 includes a plurality of actuating members, such as pushbuttons A, B, C, and D. The number of answers provided for the student corresponds to the number of actuating members and each question is identified by a number, letter or other indicia corresponding to a respective one of the actuating members. When a question is presented to the student, the student "answers" the question by operating an appropriate one of the actuating members. Each of the actuating members causes a respective signal to be sent to the logic network 8 which has been conditioned by the network conditioning means 4 to recognize the signal which represents the correct answer. The logic network 8 determines whether the student's response is correct or incorrect and sends appropriate signals to the answer sorting means 10 which sorts the signals from the logic network 8 and actuates the answer responsive means 12 to indicate whether the student's response was correct or incorrect.

Figure 2:
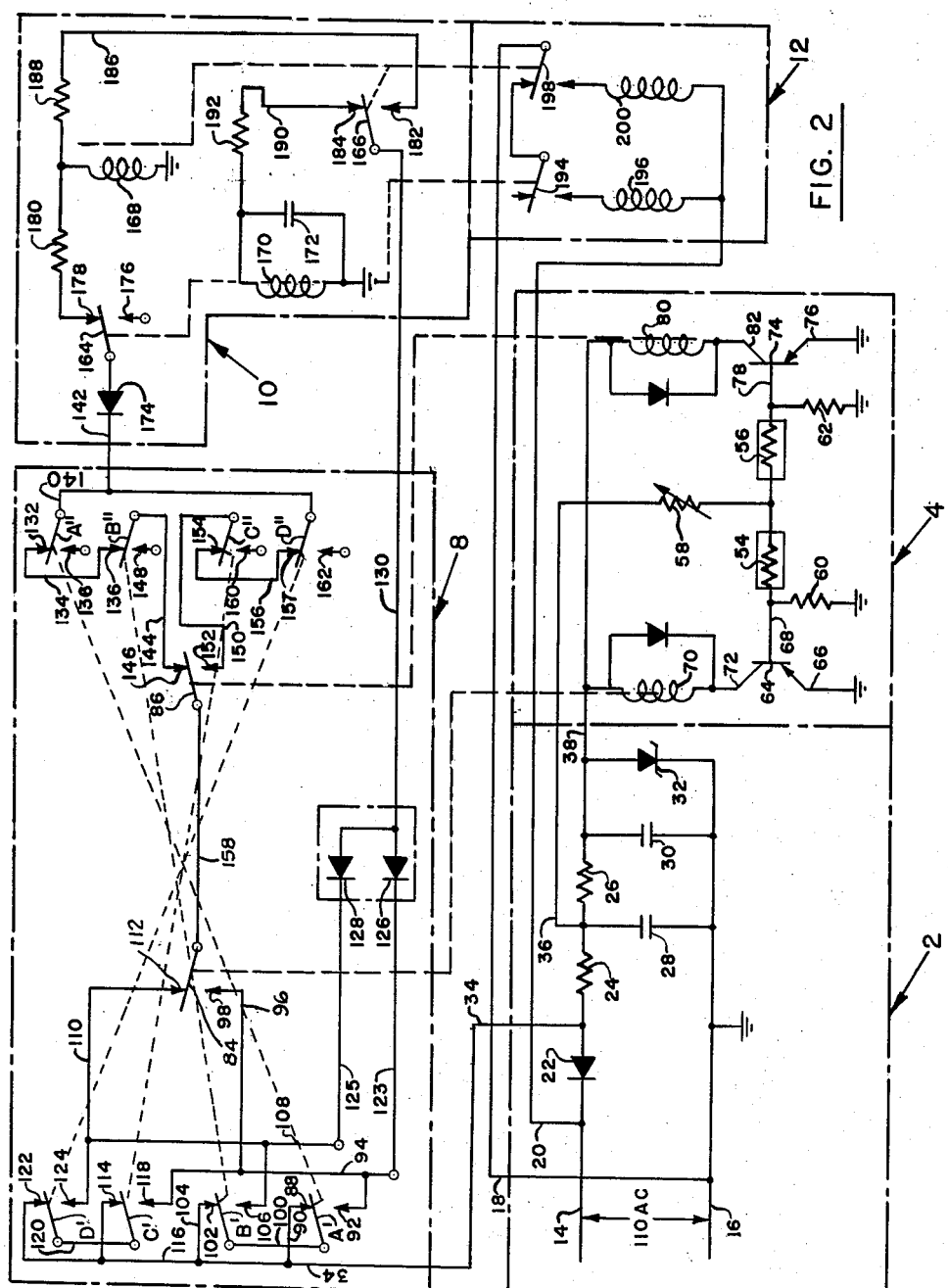
FIG. 2 is a diagrammatic representation of the electrical circuit for the teaching machine of FIG. 1.

FIG. 2 illustrates the circuit of FIG. 1 in greater detail. The elements of the block diagram of FIG. 1 have been identified in FIG. 2 by broken lines enclosing associated components. The answering means 6 of FIG. 1 is not shown in FIG. 2. However, as will be explained, the pushbuttons A, B, C, and D of answering means 6 serve to actuate respective switches in the logic network 8.

*Power Supply*

The power supply 2 is energized by line voltage through conductors 14 and 16. Output conductors 18 and 20 are connected respectively to opposite sides of the line.

The line voltage is then rectified by rectifier 22 and is passed through a filter comprising resistors 24 and 26, capacitors 28 and 30, and Zener diode 32. Output conductors 34, 36, and 38 are connected to power supply conductor 14 while power supply conductor 16 is grounded.

*Network Conditioning Means*

Figure 3:
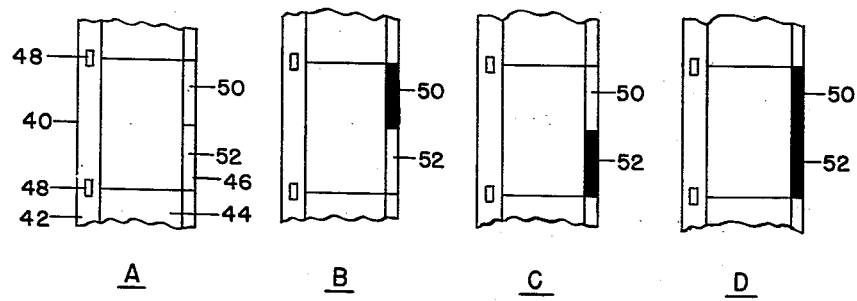
FIG. 3A is an enlarged representation of one frame of a film strip coded to indicate answer "A" as the correct answer to the question presented by that frame.
FIG. 3B is a view similar to FIG. 3A showing one frame of a film strip coded to indicate answer "B" as the correct answer.
FIG. 3C is a view similar to FIG. 3A showing one frame of a film strip coded to indicate answer "C" as the correct answer.
FIG. 3D is a view similar to FIG. 3A showing one frame of a film strip coded to indicate answer "D" as the correct answer.

As indicated above, the student is provided with a question and a plurality of answers. The purpose of the network conditioning means 4 is to supply the correct answer to the logic network 8 so that the logic network 8 will "recognize" the correct response by the student and will reject any incorrect response. Where the questions and answers are supplied to the student on a film strip, the network conditioning means may be made responsive to a coded portion of the film adjacent each frame but outside of the projection area of the frame. Thus, as seen in FIG. 3, the film strip 40 is divided into three portions: a drive area 42, a projection area 44, and a code area 46. The drive area 42 is formed with a plurality of spaced perforations 48 which are engageable by suitable drive means on the projector to advance the film. The projection area 44 contains the question and answer which are to be presented to the student. When the film is projected, this is the only area which can be observed by the student. The code area 46 is provided with suitable coded means to indicate the correct answer on the adjacent frame of the projection area 44. As shown, the code area 46 is divided into an upper portion 50 and a lower portion 52 adjacent each frame of the projection area 44. The opacity or transparency of the portions 50 and 52 provide the coded means for indicating the correct answer. Thus, where four answers are provided for each question and the answers are identified for the student as A, B, C, and D, the correct answer may be indicated by appropriate coding of the portions 50 and 52 as follows:

| Answer | A | B | C | D |
|---|---|---|---|---|
| Upper Portion | Transparent | Opaque | Transparent | Opaque. |
| Lower Portion | do | Transparent | Opaque | Do. |

The coding described above is illustrated in FIG. 3.

To sense this coding, light is passed through the code area 46 of the film and photoresponsive means are provided to detect passage of light through the film. As seen in FIG. 2, the photoresponsive means are photoresistors 54 and 56 having resistances which vary inversely as the intensity of light incident thereon. Photoresistor 54 forms part of a voltage divider comprising resistors 58 and 60 while photoresistor 56 forms part of a parallel voltage divider comprising resistors 58 and 62. Common resistor 58 has one end thereof connected to a junction between photoresistors 54 and 56 and has its opposite end connected to output conductor 36 of the power supply 2. Resistor 60 is connected between photoresistor 54 and ground while resistor 62 is connected between photoresistor 56 and ground. A transistor 64 is provided and has its emitter 66 connected to ground while its base 68 is connected to the junction between photoresistor 54 and resistor 60. A relay 70 is connected between the collector 72 of transistor 64 and output conductor 38 of the power supply 2. Similarly, a second transistor 74 has its emitter 76 connected to ground and its base 78 connected to the junction between photoresistor 56 and resistor 62. A relay 80 is connected between the collector 82 of transistor 74 and output conductor 38 of power supply 2. Relays 70 and 80 actuate series connected switches 84 and 86, respectively, in the logic network 8 under the control of transistors 64 and 74 which, in turn, are controlled by photoresistors 54 and 56.

In operation, photoresistors 54 and 56 are positioned to detect light passing through the code area 46 of the film 40. Thus, for example, photoresistor 54 might be positioned to detect light passing through upper portion 50 of the code area 46 of film 40 while photoresistor 56 might be positioned to detect light passing through lower portion 52 of the code area 56.

With no light passing through the film 40, as would be the case when both code portions 50 and 52 are opaque, as in FIG. 3D, the resistance of both photoresistors 54 and 56 would be high. Hence, no base current would flow for transistors 64 and 74 and the transistors would be nonconductive. Consequently, relays 70 and 80 would both be deenergized and series connected switches 84 and 86 of the logic network 8 would be in the positions shown. With this condition obtaining, if the student responded to the question by pressing pushbutton D on the answering means 6 of FIG. 1, the teaching machine would indicate a correct answer. If any other of the pushbuttons A, B or C were pressed, the teaching machine would indicate an incorrect answer. Thus, the network conditioning means 4 senses the correct answer from the code area of the film and conditions the logic network 8 to "recognize" the correct answer, in this case answer "D."

If one of the code portions 50 or 52 is transparent, as seen in FIGS. 3B and 3C, light will pass through that portion of the film and will be incident on the adjacent photoresistor 54 or 56. Assume, for example, that the upper portion 50 of code area 46 is opaque and that the lower portion 52 is transparent, as seen in FIG. 3B. When this occurs, the resistance of the adjacent photoresistor, in this case, photoresistor 54, will be greatly reduced and base current can then flow to the associated transistor, in this case, transistor 64. The flow of base current renders transistor 64 conductive and allows current to flow from output conductor 38 of power supply 2 through relay 70 and transistor 64 to ground. Thus, relay 70 is energized and operates to move switch 84 of logic network 8 to its other contact. Since no light is passing through lower portion 52 of the code area 46, the resistance of photoresistor 56 will remain high. Therefore, no base current will flow to transistor 74. Consequently, transistor 74 will remain nonconductive and relay 80 will remain deenergized. As a result, switch 86 will be unchanged. This conditions the logic network 8 to "recognize" answer "B" as the correct answer. If the code area 46 of film 40 is coded as shown in FIG. 3C, photoresistor 54 will have a high resistance while photoresistor 56 will have a low resistance. Hence, switch 84 of logic network 8 will be in the position shown in FIG. 2 while switch 86 of the logic network 8 will be moved to its opposite position. This conditions the logic network 8 to "recognize" answer "C" as the correct answer. Should both code portions 50 and 52 be transparent, as seen in FIG. 3A, the resistance of both photoresistors 54 and 56 will be reduced. Consequently, both relays 70 and 80 will be energized and switches 84 and 86 of the logic network 8 will both be moved to their opposite positions. This conditions the logic network 8 to "recognize" answer "A."

Thus, as has been described, the network conditioning means 4 senses the correct answer from the code area of the film and conditions the logic network 8 to "recognize" a correct response by the student.

*Logic Network*

The purpose of the logic network, indicated generally at 8 in FIG. 2, is to determine whether the student's response to any given question is correct or incorrect and to actuate either the correct answer responsive means 10 or the punitive device 12.

The logic network 8 comprises a plurality of parallel connected switches and each of the pushbuttons A, B, C, and D of the answering means 6 of FIG. 1 actuates a respective pair of the parallel connected switches in the logic network 8. The switches are identified in FIG. 2 by the letter of the corresponding pushbutton, the switches on the input side of logic network 8 being identified by a primed letter, such as A', and the switches on the output side of logic network 8 being identified by a double primed letter, such as A".

The logic network 8 is energized by power supply 2 through output conductor 34 of the power supply 2. On the input side of logic network 8, switch A' is normally biased into engagement with contact 88 which is connected by condutcor 90 to output conductor 34 of the power supply 2. When pushbutton A is pressed, switch A' is moved into engagement with contact 92 which is connected by conductors 94 and 96 to contact 98 of series connected switch 84. The arm of switch A' is connected by conductor 100 to the arm of switch B'. Switch B' normally engages contact 102 which is connected by conductor 104 to power supply output conductor 34. When pushbutton B is pressed, switch B' is moved into engagement with contact 106 which is connected by conductors 108 and 110 to contact 112 of switch 84. Switch C' normally engages contact 114 which is connected to power supply output conductor 34 by conductor 116. When pushbutton C is pressed, switch C' is moved into engagement with contact 118 which is connected by conductors 94 and 96 to contact 98. The arm of switch C' is connected to the arm of switch D' by conductor 120. Switch D' is normally biased into engagement with contact 122 which is connected to power supply output conductor 34 by conductor 116. When pushbutton D is pressed, switch D' is moved into engagement with contact 124 which is connected by conductors 108 and 110 to contact 112 of switch 84. In addition, conductors 94 and 108 are connected by conductors 123 and 125 to isolation diodes 126 and 128, respectively, and thence to the wrong answer output conductor 130 of the logic network 8.

On the output side of logic network 8, switch A" is normally biased into engagement with contact 132 which is connected by conductor 134 to contact 136 of switch B". When pushbutton A is pressed, switch A" is moved into engagement with contact 138 which is an open contact. The arm of switch A" is connected by conductor 140 to correct answer output conductor 142 of the logic network 8. Switch B" is normally biased into engagement with contact 136 which, as noted above, is connected by conductor 134 to contact 132 of switch A". The arm of switch B" is connected by conductor 144 to contact 146 of series connected switch 86. When pushbutton B is pressed, switch B" is moved into engagement with open contact 148. The arm of switch C" is connected by conductor 150 to contact 152 of switch 86 and is normally biased into engagement with contact 154 which is connected by conductor 156 to contact 157 of switch D". When pushbutton C is pressed, the switch is moved into engagement with open contact 160. The arm of switch D" is connected by conductor 140 to correct answer output conductor 142 of the logic network 8. Switch D" normally engages contact 157 which, as described above, is connected by conductor 156 to contact 154 of switch C". When pushbutton D is pressed, switch D" is moved into engagement with open contact 162.

In addition, the arms of switches 84 and 86 are connected in series by conductor 158. As discussed in the description of network conditioning means 4, switches 84 and 86 are actuated, respectively, by relays 70 and 80 of the network conditioning means 4. Thus, the logic network 8 comprises a plurality of parallel open circuits which may be completed by pressing any of the pushbuttons on the answering means 6. The logic network 8 is conditioned by the network conditioning means 4 to establish one of the parallel circuits as a "preferred" or correct answer circuit and the answer response means 12 indicates whether the student has pressed the correct pushbutton or one or more incorrect pushbuttons.

In the operation of the logic network 8, the correct answer to each question is sensed by the network conditioning means 4 and switches 84 and 86 are positioned appropriately. The positioning of switches 84 and 86 is discussed in detail in connection with the description of network conditioning means 4. However, the switch positions for each answer may be summarized as follows:

| Correct Answer | Switch | Switch |
| --- | --- | --- |
| A | Engages contact 98 | Engages contact 152. |
| B | Engages contact 112 | Do. |
| C | Engages contact 98 | Engages contact 146. |
| D | Engages contact 112 | Do. |

With this summary in mind, the operation of the logic network 8 can now be described as it functions to "recognize" correct answers and to reject incorrect answers.

If answer A is correct, this will be sensed by the network conditioning means 4 and switches 84 and 86 will be moved to engage contacts 98 and 152, respectively. Now, if the student correctly presses pushbutton A, switch A' will be moved to engage contact 92 and switch A" will be moved to open contact 138. Thus, a circuit will be completed from power supply 2 through conductors 34 and 104, contact 102 of switch B', the arm of switch B', conductor 100, the arm of switch A', contact 92 of switch A', conductors 94 and 96, contact 98 of switch 84, the arm of switch 84, conductor 158, the arm of switch 86, contact 152 of switch 86, conductor 150, the arm of switch C", contact 154 of switch C", conductor 156, contact 157 of switch D", the arm of switch D" and conductor 140 to the correct answer output conductor 142 of the logic circuit 8.

If an incorrect pushbutton were pressed, no such circuit would be completed. Thus, if pushbutton B or D were pressed, a circuit would be completed as far as contact 112 of switch 84. However, since switch 84 has been conditioned by the network conditioning means 4 to engage contact 98 of recognition of an "A" answer, the circuits for pushbuttons B and D are open at contact 112 of switch 84. If pushbutton C were pressed, a circuit would be completed through switches 84 and 86 to the arm of switch C". However, when pushbutton C is pressed, switch C" is moved to engage open contact 160 of switch C". Therefore, the circuit will be broken at this point.

Should the student attempt to cheat the machine by pressing two or more of the pushbuttons simultaneously, he will find that he cannot, thereby, obtain a correct answer signal. Since the circuit for correct answer "A" includes the switch arms of switches B', C", and D", all of these switches must be in their normal position or the circuit will be broken. Specifically, if pushbuttons A and B are pressed simultaneously, connected switches A' and B' will both be disconnected from the power supply 2 while connected switches C' and D' will both be connected to the power supply 2. Hence, no circuit will be completed across the input side of the logic network 8. If either pushbutton C or D is pressed at the same time as pushbutton A, the circuit will be completed through the input side of the logic network 8 but will be broken by appropriate switch C" or D" in the output side of the logic network 8. Thus, if any one or more of pushbuttons B, C, and D are pressed simultaneously with pushbutton A, the "A" circuit will be broken and no signal will appear on the correct answer output conductor 142 of the logic network 8.

Moreover, no combination of the pushbuttons which does not include pushbutton A can achieve a correct answer response when the logic network 8 has been conditioned for an "A" answer. When so conditioned, switch 84 engages contact 98. However, only switches A' and C' can complete a circuit to contact 98 across the input side of the logic network 8. Thus, pushbutton A or C or both must be pressed to complete a circuit across the input side of network 8. On the other hand, when conditioned for an "A" answer, switch 86 engages contact 152. This requires that switch C″ must be in its normal position in order to complete a circuit across the output side of the logic network 8 or, in other words, the "A" circuit cannot be completed if pushbutton C is pressed.

Similar explanations can be made for the situations obtaining when switches 84 and 86 of the logic network 8 have been conditioned by network conditioning means 4 to "recognize" "B" answers, "C" answers or "D" answers. However, it is not believed to be necessary to make such explanations at this point. Suffice it to say that where the logic network has been conditioned to "recognize" any given answer, only the appropriate pushbutton can establish a complete circuit through the logic network 8 from power supply 2 to the correct answer output conductor 142. Moreover, if the correct pushbutton is pressed in combination with any one or more of the other pushbuttons, the correct answer circuit will not be completed.

Before leaving the discussion of logic network 8, it should be noted that by pressing any one of the pushbuttons individually or any of several combinations of the pushbuttons, circuits can be completed across the input side of the logic network 8 from power supply 2 to conductors 94 or 108 or both. Since conductors 94 and 108 are both connected to the wrong answer output conductor 130, this means that pressing any of the pushbuttons, either singly or in certain combinations, will cause a signal to be applied to the wrong answer output conductor 130.

*Answer Sorting Means*

As has been described with respect to the logic network 8, a signal can be obtained on the correct answer output conductor 142 of logic network 8 only by pressing the pushbutton corresponding to the correct answer and, then, only if the correct answer pushbutton is pressed individually. On the other hand, a signal appears on the wrong answer output conductor 130 of the logic network 8 whenever any of the pushbuttons, including the correct one, is pressed individually and also when certain combinations of the pushbuttons are pressed simultaneously. Any other combination of the pushbuttons will fail to complete a circuit across the input side of logic network 8 and no response whatsoever will be obtained. Accordingly, the purpose of the answer sorting means 10 is to sort the signals from the logic network 8 and to actuate the answer responsive means 12 appropriately.

Circuitwise, the answer sorting means 10 comprises two switches 164 and 166, a correct answer relay 168, and wrong answer relay 170. The wrong answer relay 170 is connected in parallel with a time delay capacitor 172. Switch 164 is connected by isolation diode 174 to the correct answer output conductor 142 of the logic network 8 while switch 166 is connected to the wrong answer output conductor 130 of logic network 8. Switch 164 is provided with contacts 176 and 178. Contact 176 is an open contact and switch 164 is normally biased into engagement with contact 178 which is connected through a suitable voltage dropping resistor 180 to the correct answer relay 168. Switch 166 is provided with contacts 182 and 184 and is normally biased into engagement with contact 184. Contact 182 is connected through conductor 186 and a suitable voltage dropping resistor 188 to the correct answer relay 168 while contact 184 is connected by conductor 190 and current limiting resistor 192 to one side of the parallel circuit including wrong answer relay 170 and capacitor 172. The opposite side of the parallel circuit is grounded. The position of switch 164 is controlled by wrong answer relay 170 while the position of switch 166 is controlled by correct answer relay 168.

In operation, when a signal appears on the wrong answer output conductor 130 of logic network 8, the signal passes through the arm of switch 166 and through contact 184 and conductor 190 and current limiting resistor 192 to the parallel circuit including wrong answer relay 170 and capacitor 172. Capacitor 172 introduces a time delay so that wrong answer relay 170 is not actuated immediately. However, if no signal appears on the correct answer output conductor 142 of the logic network 8 during this time delay, wrong answer relay 170 is finally actuated and serves to break the correct answer input circuit by moving switch 164 to engage open contact 176. At the same time, wrong answer relay 170 operates switch 194 of the answer response means 12 to energize a punitive device, represented in FIG. 2 by relay 196. The punitive device may serve to provide an audible or visual indication that the student has responded incorrectly and may actuate a scoring device or perform other suitable functions.

If, before wrong answer relay 170 is actuated, a signal does appear on the correct answer output conductor 142 of logic network 8, this signal will pass through the arm of switch 164 and through contact 178 of switch 164 and resistor 180 to correct answer relay 168. Correct answer relay 168 reacts promptly to move switch 166 to engage contact 182. This breaks the charging circuit for capacitor 172 and prevents wrong answer relay 170 from being actuated. The charge already accumulated by capacitor 172 can leak off through wrong answer relay 170 to ground but will be insufficient to actuate wrong answer relay 170. At the same time, the signal on wrong answer output conductor 130 of the logic network will now flow through the arm of switch 166, contact 182 of switch 166, conductor 186 and resistor 188 to correct answer relay 168 to cause the correct answer relay 168 to remain activated so long as a pushbutton in the answer means 12 remains closed. When correct answer relay 168 is actuated, it also operates switch 198 of the answer response means 12 to break the energizing circuit for the punitive device and to complete a reward device, represented by relay 200. The reward device may serve to provide an audible or visible indication that the student has responded correctly and may trigger the film movement to advance the film to the next question, actuate a scoring mechanism or perform other suitable functions.

*Modified Logic Network*

Should the student attempt to cheat the teaching machine by pressing a plurality of pushbuttons simultaneously, it is desirable that any such attempt would result in actuation of the punitive device. This is accomplished, for many combinations of pushbuttons, with the logic network of FIG. 2, as described above. However, when the logic network of FIG. 2 is used, there are some combinations of pushbuttons which may be pressed simultaneously without actuating the punitive device. Thus, for example, if pushbuttons A and B are pressed simultaneously, connected switches A′ and B′ of FIG. 2 will both be disconnected from the power supply 2 while connected switches C′ and D′ will both be connected to the power supply 2. Hence, no circuit will be completed across the input side of the logic network 8 and no signal will appear on conductors 123 and 125. Therefore, while such action will not gain a correct answer for the student, it also will not provide a wrong answer signal. Thus, the student is not penalized for this action.

Figure 4:
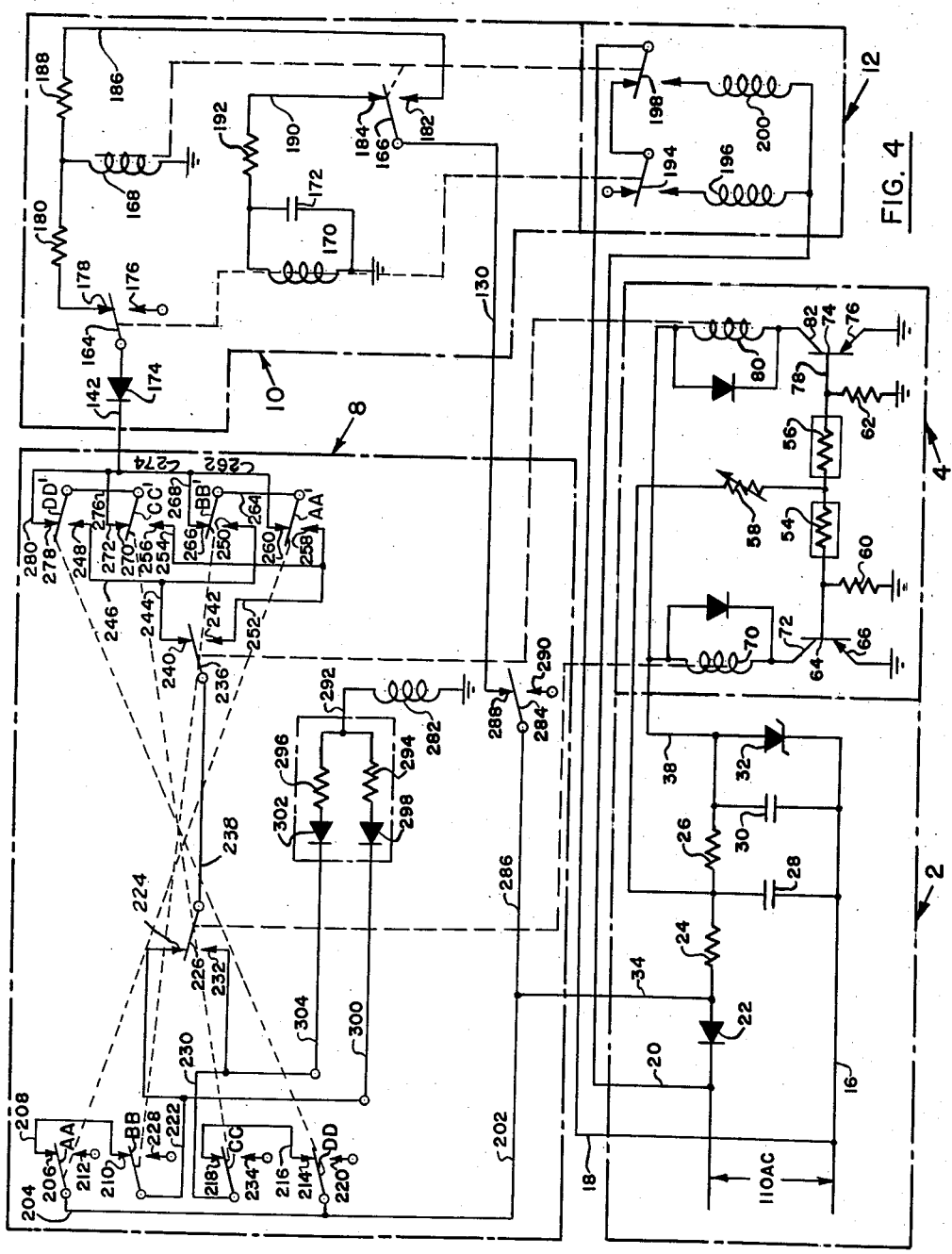
FIG. 4 is a diagrammatic representation of a modified electrical circuit for the teaching machine of FIG. 1.

To overcome this deficiency, the circuit of FIG. 4 may be employed. With this circuit, pressing of any pushbutton, whether singly or in any combination, will result in actuation of the wrong answer device unless the wrong answer device has been disconnected by a correct answer signal which can only be obtained by individual pressing of the correct pushbutton.

The only differences between the circuit of FIG. 4 and that of FIG. 2 are found within the logic network 8. Thus, no discussion will be made at this point of the circuitry or functioning of the power supply 2, network conditioning means 4, answer sorting means 10 or answer response means 12. For detailed discussion of these components, reference may be made to the appropriate portions of the description of the circuit of FIG. 2 hereinabove.

Each of the pushbuttons of the answering means 6 of FIG. 1 actuates a respective pair of switches in the logic network 8 of FIG. 4. These switches are identified by double letters corresponding to the letter of the appropriate pushbutton, the switches on the input side of the logic network 8 being identified by unprimed double letters, such as switch AA, and the switches on the output side of the logic network 8 being identified by primed double letters, such as switch AA'.

The logic network 8 receives current from power supply 2 through output conductor 34 of power supply 2 and this current is passed by conductors 202 and 204 to the arms of switches AA and DD. Switch AA is normally biased into engagement with contact 206 which completes a circuit through conductor 208 to contact 210 of switch BB. When pushbutton A is pressed, switch AA moves to engage open contact 212. Similarly, switch DD is biased into engagement with contact 214 which completes a circuit through conductor 216 to contact 218 of switch CC. When pushbutton D is pressed, switch DD moves to engage open contact 220. The arm of switch BB is connected by conductor 222 to contact 224 of switch 226 and normally engages contact 210 to complete a circuit from conductor 208 to contact 224 of switch 226. When pushbutton B is pressed, switch BB moves to engage open contact 228. The arm of switch CC is connected by conductor 230 to contact 232 of switch 226 and normally engages contact 218 to complete a circuit from conductor 216 to contact 232 of switch 226. When pushbutton C is pressed, switch CC moves to engage open contact 234.

The arm of switch 226 is connected to the arm of switch 236 by conductor 238. The positions of switches 226 and 236 are controlled by the network conditioning means 4 in the same manner as switches 84 and 86 in the circuit of FIG. 2. For a detailed discussion of this control, reference should be made to the portion of the description of FIG. 2 relating to the network conditioning means 4. In such reference, switch 226 of FIG. 4 corresponds to switch 84 of FIG. 2 and switch 236 of FIG. 4 corresponds to switch 86 of FIG. 2.

On the output side of the logic network 8 of FIG. 4, switch 236 is provided with contacts 240 and 242. Contact 240 of switch 236 is connected by conductors 244 and 246 to contact 248 of switch DD' and to contact 250 of switch BB'. Contact 242 of switch 236 is connected by conductors 252 and 254 to contact 256 of switch CC' and to contact 258 of switch AA'. The arm of switch AA' normally engages contact 260 which is connected by conductor 262 to the correct answer output conductor 142 of the logic circuit 8 and, when pushbutton A is pressed, switch AA' moves to engage contact 258. In addition, the arm of switch AA' is connected by conductor 264 to the arm of switch BB'. Switch BB' normally engages contact 266 which is connected by conductor 268 to the correct answer output conductor 142 of the logic circuit 8 and, when pushbutton B is pressed, switch BB' moves to engage contact 250. Similarly, switch CC' normally engages contact 270 which is connected by conductors 272 and 274 to the correct answer output conductor 142. When pushbutton C is pressed, switch CC' moves to engage contact 256. The arm of switch CC' is connected by conductor 276 to the arm of switch DD'. Switch DD' normally engages contact 278 which is connected by conductors 280 and 274 to the correct answer output conductor 142 and, when pushbutton D is pressed, switch DD' moves to engage contact 248. To complete the circuitry of the logic network 8 of FIG. 4, a relay 282 is provided and serves to control switch 284. The arm of switch 284 is connected by conductor 286 to output conductor 34 of the power supply 2 and normally engages contact 288 which is connected to the wrong answer output conductor 130 of the logic network 8. When relay 282 is energized, switch 284 moves to engage open contact 290. Relay 282 has one end thereof connected to ground while the opposite end is connected by conductor 292 to a junction between two parallel resistors 294 and 296. The opposite end of resistor 294 is connected through isolation diode 298 and conductor 300 to conductor 222 while the opposite end of resistor 296 is connected through isolation diode 302 and conductor 304 to conductor 230. The values of resistors 294 and 296 are chosen so that current through both resistors 294 and 296 simultaneously is required to energize relay 282.

In the operation of the logic network 8 of FIG. 4, with no pushbuttons pressed, current flows from output conductor 34 of power supply 2 through conductors 202 and 204 to switches AA and DD on the input side of the logic network 8. Since no pushbuttons are pressed, all of the switches are in their normal positions. Thus, current flows through the arm of switch AA to contact 206 and, thence, through conductor 208, contact 210, the arm of switch BB and conductor 222 to contact 224 of switch 226, which is controlled by the network conditioning means. Part of this current also flows from conductor 222 through conductor 300, isolation diode 298, resistor 294 and conductor 292 to relay 282. At the same time, current flows through the arm of switch DD to contact 214 and, thence, through conductor 216, contact 218, the arm of switch CC and conductor 230 to contact 232 of switch 226. Part of this current flows from conductor 230 through conductor 304, isolation diode 302, resistor 296 and conductor 292 to relay 282. Current also flows from output conductor 34 of power supply 2 through conductor 286 to the arm of switch 284. However, since current is now flowing through both resistors 294 and 296, relay 282 will be energized to cause switch 284 to engage open contact 290. Thus, no signal will appear on the wrong answer output conductor 130 of the logic network 8.

As stated above, the value of resistors 294 and 296 are chosen such that current flow through both resistors 294 and 296 simultaneously is required to energize relay 282. However, it should be noted that the energizing circuit through resistor 294 requires that switches AA and BB both be in their normal positions. Consequently, if pushbutton A or B or both is pressed, the energizing circuit through resistor 294 will be broken causing relay 282 to be partially deenergized. Similarly, it will be seen that the charging circuit through resistor 296 will be broken if switches CC and DD are not both in their normal positions. Thus, if pushbutton C or D or both is pressed, the circuit through resistors 296 will be broken and, again, relay 282 will be partially deenergized. Either way, the partial de-energization of relay 282 allows switch 284 to engage contact 288 and completes a circuit from the output conductor 34 of power supply 2 through conductor 286, the arm of switch 284, contact 288 and wrong answer output conductor 130 to begin charging capacitor 172 in the answer sorting means 10. A full discussion of the circuitry and operation of the answer sorting means 10 may be found hereinabove in the description of FIG. 2. However, it may be seen from the foregoing discussion, that pressing of any pushbutton, either singly or in combination, will result in partial deenergization of relay 282 and, consequently, will cause the punitive device to be actuated unless the punitive circuit has been broken by a signal on the correct answer output conductor 142 of the logic network 8. Such a signal occurs only when the correct pushbutton is pressed individually.

Switches 226 and 236 are conditioned by the network conditioning means 4 to "recognize" the correct answer to the question which is being presented to the student, as indicated above, and the switches 226 and 236 are shown, in FIG. 4, conditioned to "recognize" answer "D." If the student presses pushbutton D, switch DD will be moved to engage open contact 220 and switch DD' will be moved to engage contact 248. This will break the energizing circuit through resistor 296 and will partially deenergize relay 282, allowing switch 284 to engage contact 288 to apply a signal to the wrong answer output conductor 130. At the same time, the movement of switch DD' to contact 248 completes a circuit from output conductor 34 of the power supply 2 through conductors 202 and 204, the arm of switch AA, contact 206, conductor 208, contact 210, the arm of switch BB, conductor 222, contact 224, the arm of switch 226, conductor 238, the arm of conductor 236, contact 240, conductors 244 and 246, contact 248, the arm of switch DD', conductor 276, the arm of switch CC', contact 270 and conductors 272 and 274 to the correct answer output conductor 142. As pointed out in the discussion of the answer sorting means 10 in the description of FIG. 2, the signal on the correct answer output conductor 142 serves to break the punitive circuit and to complete a reward circuit.

It will be seen from this discussion that, in order to complete the correct answer circuit for answer "D," switches AA, BB, and CC' must all be in their normal positions. Thus, if pushbutton A, B, or C, or any combination thereof, is pressed simultaneously with pushbutton D, the correct answer circuit cannot be completed. While it is not believed to be necessary, for the purposes of this description, it can be shown that, for any given correct answer, there is one, and only one, circuit which can be completed through the logic network 8 to the correct answer output conductor 142 and this circuit can be completed only by pressing individually the pushbutton corresponding to the correct answer. On the other hand, it has been shown that pressing any of the pushbuttons, either singly or in combination, will cause a circuit to be completed to the wrong answer output conductor 130. Thus, the punitive device will be actuated by any and all responses which the student may make except individual pressing of the pushbutton corresponding to the correct answer.

While the power supply 2 has been shown in FIG. 2 as being energized by line voltage, it will be apparent that the circuit can be made to operate on either alternating or direct current without departing from the invention. Moreover, while the network conditioning means 4 has been described in a preferred form for sensing the correct answer from the code area of a film strip, it is clear that other forms of network conditioning means could also be employed. In addition numerous other variations and modifications may, obviously be made without departing from the invention. Accordingly, it should be clearly understood that the form of the invention described above and shown in the figures of the accompanying drawings are illustrative only and are not intended to limit the scope of the present invention.

What is claimed is:

1. In apparatus of the character disclosed, question and multiple-choice answer display means including a plurality of selectively operable members equal in number to the number of multiple-choice answers, electrical power source means, output circuit means including answer indicator actuating relay means, energizing circuit means between said power source means and said output circuit means, including first and second groups of switches and control switch means in series between said groups of switches, each switch in said first group and a corresponding switch in said second group being operable simultaneously by one of said selectively operable members, and means responsive to the display of a question and multiple-choice answer by said display means effective for determining control positioning of said control switch means in accordance with the correct answer to the question displayed, whereby upon operation of that one of said selectively operable members corresponding to the correct answer, the resulting operation of its associated switch in each of said first and second groups of switches completes the energizing circuit means through said control switch means to said output circuit means to cause operation of said answer indicator actuating relay means.

2. In apparatus of the character disclosed, question and multiple-choice answer display means including a plurality of selectively operable members one for each multiple-choice answer, electrical power source means, output circuit means including a correct answer indicator actuating relay means and an incorrect answer indicator actuating relay means, energizing circuit means between said power source means and said output circuit means for causing energization of said correct answer indicator actuating relay means, said energizing circuit means including first and second groups of switches and control switch means in series between said first and second groups of switches, each switch in said first group and a corresponding switch in the second group being operable simultaneously by one of said selectively operable members, means responsive to the display of a question and multiple-choice answer by said display means effective for determining control positioning of said switch means in accordance with the correct answer to the question displayed, said energizing circuit means being completed to said output circuit means upon operation of that one of said selectively operable members corresponding to the correct answer, to cause energization of the correct answer indicator actuating relay means, and second energizing circiut means connected to said output circuit means and responsive to operation of any of said selectively operable members other than sole operation of that one of said members corresponding to the correct answer, for causing energization of said incorrect answer indicator actuating relay means.

3. In apparatus for use with a teaching machine, question and multiple-choice answer display means including selectively operable members one for each multiple-choice answer, an electrical network including a plurality of parallel connected switches and a pair of series connected switches, said series connected switches each being movable to a first position for series connection with certain of said parallel connected switches and movable to a second position for series connection with other of said parallel connected switches, means responsive to the display of a question and multiple-choice answer by said display means for positioning said series connected switches to establish a preferred circuit through said network, said preferred circuit including preselected ones of said parallel connected switches, each of said selectively operable members being operable to actuate respective ones of said parallel connected switches to complete respective circuits through said network, a correct answer indicator actuating relay, first electrical control means including a control switch in connection to said electrical network and responsive to completion of said preferred circuit for causing operation of said correct answer indicator actuating relay, an incorrect answer indicator actuating relay, and second electrical control means operable responsively to completion of any of said respective circuits other than said preferred circuit alone, for causing operation of said incorrect answer indicator actuating relay and operation of said control switch to disconnect said first electrical control means from said electrical network.

4. Apparatus as defined by claim 3 wherein the said second electrical control means includes a normally closed switch, and wherein the said first electrical control means is effective in its response to completion of the said preferred circuit for causing operation of the said correct answer indicator actuating relay, to open said normally closed switch.

5. In apparatus of the character disclosed, question and multiple-choice answer display means including a plurality of selectively operable members one for each multiple-choice answer; a power source; an electrical network comprising first and second two pole switches having the movable switch elements thereof in series connection, a plurality of input switches connected to said power source, certain of said input switches being connected to one pole of said first switch and others of said input switches being connected to the other pole of said first switch, an output conductor, a plurality of output switches connected to said output conductor, certain of the output switches being connected to one pole of said second switch and others of the output switches being connected to the other pole of said second switch, each input switch and one of the output switches being operable simultaneously by one of said selectively operable members; means responsive to the display of a question and multiple-choice answer by said display means effective for determining the pole contact positions of the movable switch elements of said first and second switches in accordance with the correct answer to the question displayed; a first control relay and a normally closed switch connecting the relay to said output conductor, a correct answer indicator actuating relay controlled by said first control relay, operation of that one of said selectively operable members corresponding to the correct answer to the question displayed by said display means, completing an energizing circuit through the input switch and output switch thereof, said series connected two-pole switches and said normally closed switch to said first control relay for operation thereof to cause operation of said correct answer indicator actuating relay; an incorrect answer indicator actuating relay, and a second control relay in control of the last said relay, said second control relay being in circuit with said power source and responsive to input switch operation by any of said selectively operable members other than that one corresponding to the correct answer to the question displayed, for causing operation of said incorrect answer indicator actuating relay and opening of said normally closed switch.

6. Apparatus as defined by claim 5 characterized further by means in control of the said second control relay and operated responsively to operation of the said first control relay to cause operation of the said correct answer indicator actuating relay, to render the said second control relay inoperable.

7. In apparatus for use with a teaching machine, question and multiple-choice answer display means including selectively operable members one for each multiple-choice answer, an electrical network including a plurality of parallel connected switches and a pair of series connected switches, said series connected switches each being movable to a first position for series connection with certain of said parallel connected switches and movable to a second position for series connection with other of said parallel connected switches, means responsive to the display of a question and multiple-choice answer by said display means for positioning said series connected switches to establish a preferred circuit through said network, said preferred circuit including preselected ones of said parallel connected switches, each of said selectively operable members being operable to actuate respective ones of said parellel connected switches to complete respective circuits through said network, a correct answer indicator actuating relay, an incorrect answer indicator actuating relay, an energizing circuit common to said relays and including a first two-position control switch and a second normally open control switch in series with said first control switch in one position of the latter, said first control switch in its other position completing the energizing circuit to said correct answer relay, and said first control switch in said one position and said second control switch in closed position completing the energizing circuit to said incorrect answer relay, first means operable responsively to completion of said preferred circuit for actuating said first control switch to said other position thereof, and second means operable responsively to completion of any of said respective circuits other than said preferred circuit, for actuating said second control switch to closed position.

8. Apparatus as defined by claim 7 characterized further by control means actuated by the said first means in operation thereof responsively to completion of the said preferred circuit, for rendering the said second means inoperable.

9. In apparatus for a teaching machine of film projection type, wherein each frame of the film bears a question and multiple-choice answers only one of which is correct, and presents a light passage control area predetermined as to its light passing and light interrupting character to represent the correct answer; selectively operable members one for each multiple-choice answer, an electrical network including a plurality of parallel connected switches and a pair of series connected switches, said series connected switches each being movable to a first position for series connection with certain of said parallel connected switches and movable to a second position for series connection with other of said parallel connected switches, means for sensing light passage and light interruption at said light passage control area of a film frame, operating means controlled by said sensing means for positioning said series connected switches to establish a correct answer circuit through said network, said correct answer circuit including preselected ones of said parallel connected switches, each of said selectively operable members being operable to actuate respective ones of said parallel connected switches to complete respective circuits through the network, a correct answer indicator actuating relay, first electrical control means including a control switch in connection to said electrical network and responsive to completion of said correct answer circuit for causing operation of said correct answer relay, an incorrect answer indicator actuating relay, and second electrical control means operable responsively to completion of any of said respective circuits other than said correct answer circuit alone, for causing operation of said incorrect answer relay and operation of said control switch to disconnect said first electrical control means from said electrical network.

References Cited in the file of this patent

UNITED STATES PATENTS

| | | |
|---|---|---|
| 2,401,434 | Mills | June 4, 1946 |
| 2,402,162 | Holt | June 18, 1946 |
| 2,738,595 | John et al. | Mar. 20, 1956 |
| 2,835,052 | Raich et al. | May 20, 1958 |
| 2,921,385 | Hamilton | Jan. 19, 1960 |
| 3,077,038 | Williams et al. | Feb. 12, 1963 |

FOREIGN PATENTS

| | | |
|---|---|---|
| 878,933 | Great Britain | Oct. 4, 1961 |